Jan. 23, 1945.   R. W. ALLEN   2,367,838
TIRE TESTING APPARATUS
Filed Sept. 3, 1943   3 Sheets-Sheet 1

Inventor
RAYMOND W. ALLEN

Jan. 23, 1945.  R. W. ALLEN  2,367,838

TIRE TESTING APPARATUS

Filed Sept. 3, 1943  3 Sheets-Sheet 3

Inventor
RAYMOND W. ALLEN

By *Ely & Frye*

Attorney.

Patented Jan. 23, 1945

2,367,838

UNITED STATES PATENT OFFICE 2,367,838

TIRE TESTING APPARATUS

Raymond W. Allen, Akron, Ohio, assignor to The Firestone Tire & Rubber Company, Akron, Ohio, a corporation of Ohio Application September 3, 1943, Serial No. 501,189

10 Claims. (Cl. 73—7)

This invention relates to apparatus for testing pneumatic tire casings, and more especially it relates to tire testing apparatus of the type wherein a tire under determinate inflation pressure and determinate load is peripherally driven at determinate speed to provide an accelerated road test.

Apparatus of the character mentioned usually comprises a power-driven rotary wheel or drum, and means for urging one or more tires to be tested against the peripheral face thereof. Said peripheral face may be roughened so as to have an abrasive effect comparable to a roadway, and may have one or more cleats attached thereto so as to simulate more rigorous driving conditions. The tire to be tested usually is mounted on a lever arm, and yieldingly urged toward the rotating drum, either by means of a suitably mounted static weight, or by a fluid pressure operated cylinder. In either case there is a large amount of unsprung weight, and the effect of the leverage must be considered in computing the load applied to the tire. Furthermore there is always the possibility of leakage in conventional fluid pressure operated cylinders, so that frequently there is error in the results obtained by testing machines employing the same.

The chief objects of this invention are to provide an improved tire testing machine that has flexibility of operation; that will conserve floor space as compared to tire testing machines heretofore available; that will be efficient in operation; which will produce accurate results; and which may be operated in a manner which produces side-thrust upon the tire being tested. More specific objects are to provide a tire testing machine of the character mentioned wherein the leverage factor is not present; that employs fluid pressure for applying load to the tire without the usual leakage that occurs in conventional fluid pressure cylinders; and to provide apparatus capable of testing tires of various sizes. Other objects will be manifest as the description proceeds.

Figure 1:
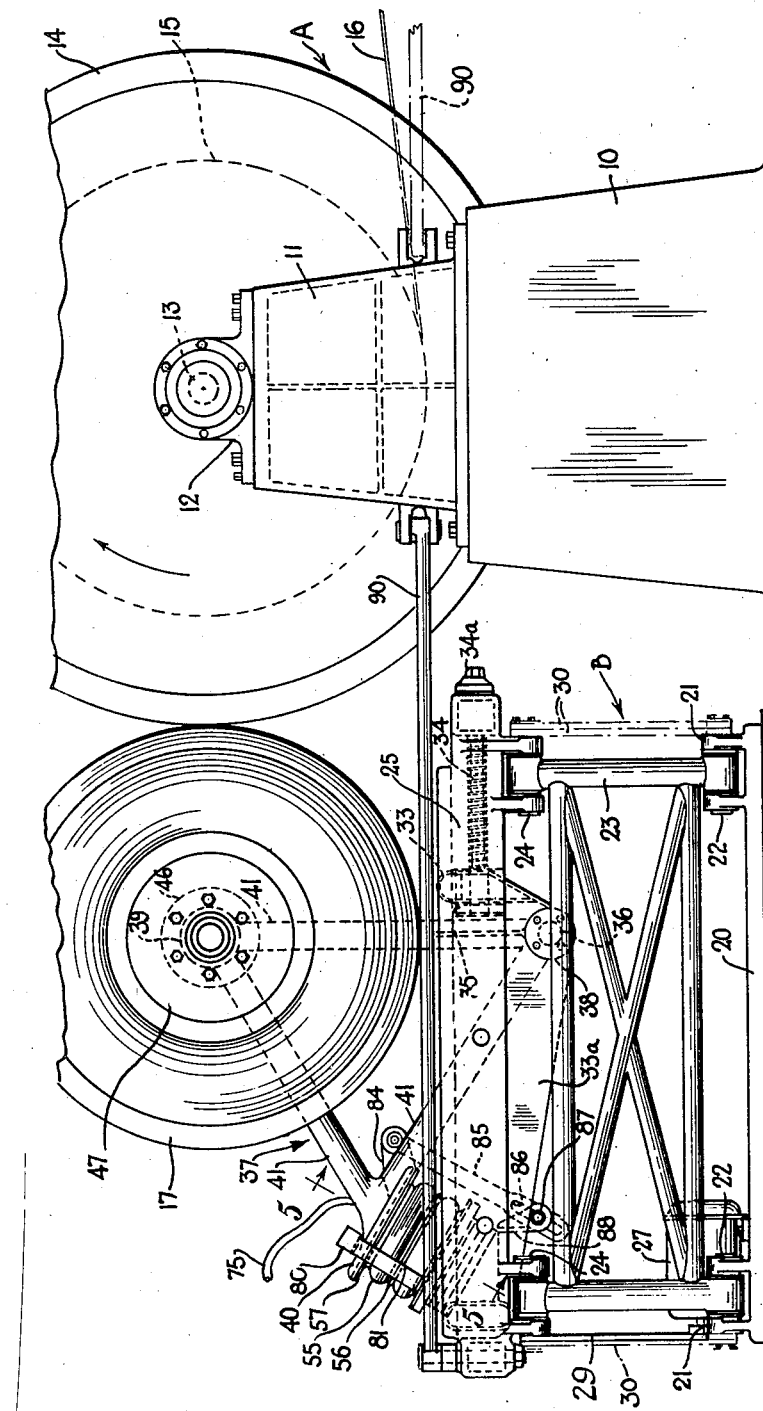
Fig. 1 is a side elevation of apparatus embodying the invention.
Figure 2:
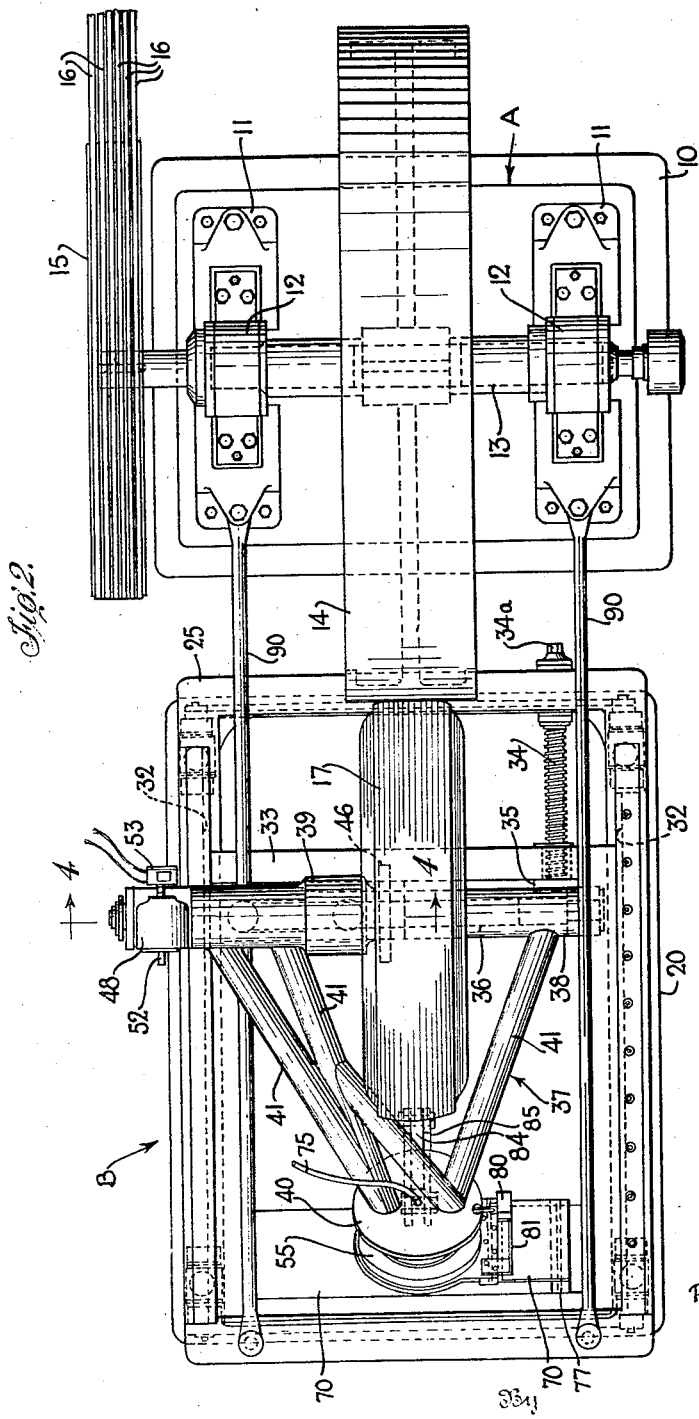
Fig. 2 is a plan view thereof.

Referring to Figs. 1 and 2 of the drawings, the invention is shown therein as consisting of a drum-supporting and rotating unit A in operative association with a tire-supporting unit B. The unit B is adapted to apply a tire under test to the perimeter of a rotating drum carried by the unit A, and although for purpose of illustration but one unit B is shown, it will be understood that the unit may be duplicated and the second unit B positioned to apply a tire to the rotating drum of unit A at a point dimetrically opposite the point of application of the tire shown.

The unit A comprises a masonry bed or base 10, and mounted upon the top thereof, at spaced apart points, are two upright frame members or standards 11, 11. Mounted upon the tops of standards 11 are respective bearing brackets 12, and journaled in the said brackets is a horizontal shaft 13. Mounted upon the latter, centrally thereof between the brackets 12, is a relatively large drum 14, the perimeter of which may be roughened, if desired, so as to exert an abrasive effect upon tires forced thereagainst, in simulation of the abrasive effect of conventional roadways. One end portion of the shaft 13 projects beyond its bearing and is provided thereat with a grooved pulley 15 about which a plurality of endless transmission belts 16, 16 are trained, said belts also being trained about a driving pulley (not shown) on an electric motor (not shown) whereby the drum 14 may be rotated at the speed desired. The rotating drum is adapted to engage the periphery of a tire to be tested and to drive the same, such a tire being shown at 17, on the unit B.

The said unit B comprises a base plate 20 that is mounted upon the floor beside the base 10 of unit A. The base plate 20 is a rectangular structure, and formed at the four corners thereof are pairs of upstanding ears 21, 21 that constitute bearing brackets for pivot pins 22, 22, all of which are disposed parallel to the plane of the tire 17 and drum 14, the pivot pins on either side of the base plate being in axial alignment with each other. Pivotally mounted upon the pivot pins 22 are two upstanding side frames 23, 23, which frames are disposed on opposite sides of the base plate and are of skeletal form and rectangular shape. Pivotally mounted at the two upper corners of each frame member 23 are respective pivot pins 24 that are parallel to the pivot pins 22 aforementioned, and pivotally supported upon the four pivot pins 24 of the two side frames 23 is a horizontally disposed top frame member 25 that is in the form of an open rectangle. The arrangement is such that the base 20, side frames 23 and top frame 25 constitute a parallel motion device whereby the top frame is enabled to move laterally, transversely of the plane of the drum 14, while maintaining its horizontal position. This transverse mobility of the top frame 25 is utilized for producing side thrust upon a tire 17 being tested, whenever it is desired to subject the tire to such test, the extent of movement of the top frame in making such test being relatively small.

Figure 3:
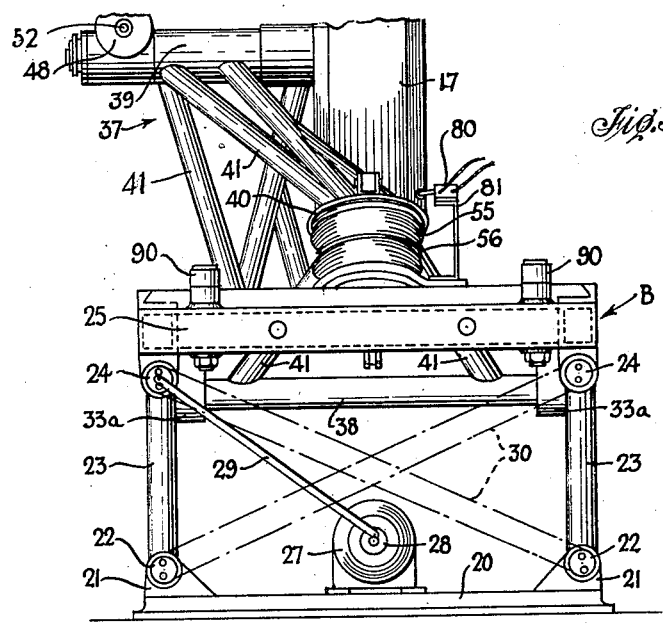
Fig. 3 is an end elevation of the apparatus as viewed from the left thereof.

For oscillating the side frames 23 to impart transverse parallel movement to the top frame 25, an electric motor 27 is mounted on the base plate 20, the drive-shaft of the motor carrying a disc 28 to which is pivotally connected, eccentrically thereof, one end of a link 29, the other end of said link being pivotally connected to one of the pivot pins 24, as is best shown in Fig. 3. The arrangement is such that driving of the motor 27 reciprocates the top frame 25, and apparatus subsequently to be described that is mounted on said top frame. If the tire test does not include the imparting of side thrust to the tire, it is preferable that the top frame 25 be retained securely in determinate position. To this end a pair of cross braces are provided for each end of the unit, each cross brace being arranged to be secured at one end to a pivot pin 22 and at its other end to be secured to a pivot pin 24. The cross braces are each designated 30 and are shown in broken lines in Fig. 1 and Fig. 3.

Opposite sides of the top frame 25 are formed at the top thereof with respective slideways 32 that extend longitudinally thereof parallel to the plane of the drum 14, and mounted upon said slideways is an open rectangular slide 33. For adjusting the position of the slide longitudinally of said slideways, an adjusting screw 34 is journaled at one of its end portions in the rail of the top frame 25 that is nearest the unit A, the threaded portion of the screw extending through an aperture in the adjacent side of the slide 33 and through a nut 35 secured thereto. The screw 34 projects from the frame 25 toward unit A and is formed thereat with a polygonal head 34a for receiving a socketed tool, such as a wrench, by which the screw may be rotated to adjust the position of the slide relatively to the top frame 25 and also relatively to the drum 14, whereby the apparatus is adapted for the testing of tires of different diameters. Such adjustment, of course, is made preparatory to the testing of the tires.

The side rails of the slide that are disposed parallel to the plane of the drum 14 extend downwardly substantially below the top frame 25, as best shown at 33a, Fig. 1, the lowermost part of said downwardly extending portions being formed with bearings that support a shaft 36 by engagement with the ends thereof, said shaft being disposed transversely of the plane of the drum 14, and located close to that side of the slide that is nearest unit A. Mounted upon the shaft 36 and adapted to oscillate thereabout is a substantially equilateral triangular frame that is designated as a whole by the numeral 37. One corner of the triangular frame 37 consists of a hub 38 through which the shaft 36 extends. Another corner, disposed upwardly of the hub 38 consists of a journal sleeve 39. The third corner of the triangular frame consists of a circular plate or disc 40. The journal sleeve 39 is disposed parallel to the hub 38, but is much shorter than the latter and is disposed entirely to one side of the central plane of the apparatus, which is the central plane of the drum 14. The plate 40 is disposed transversely of the central plane of the apparatus which plane diametrically intersects said plate. The sleeve 39 is connected to the hub 38 and to the top of plate 40 and the latter is connected to the said hub by pairs of arms 41, 41 that are integrally connected to said corner elements, the plane of the plate 40 being substantially parallel to the plane of the arms that connect it to hub 38.

Figure 4:
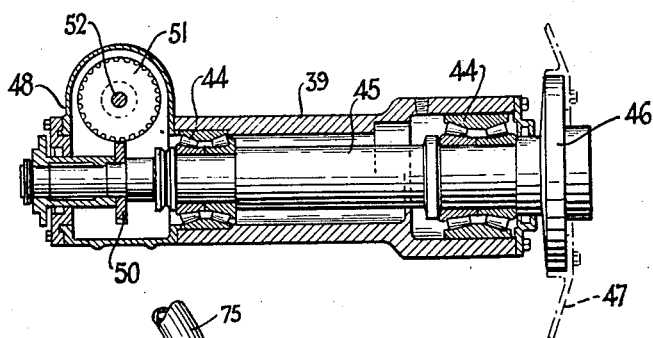
Fig. 4 is a section on the line 4—4 of Fig. 2.

As is clearly shown in Fig. 4, the journal sleeve 39 is a hollow structure containing bearings 44, 44 that support a rotatable axial spindle 45. The end of spindle 45 that is nearest the central plane of the apparatus is formed with a flange 46, said flange being designed to seat and support a wheel and rim structure 47. The latter supports the tire 17 while being tested, and preferably is of special construction to enable quick and easy application to the tire and removal therefrom. The wheel structure is bolted to the flange 46, and the tire thereon is disposed substantially in the central plane of the apparatus. The end portion of the shaft 45 that is remote from flange 46 extends into a housing 48 that is mounted upon the end of journal sleeve 39, and within said housing the shaft has a spiral gear 50 mounted thereon. The gear 50 is meshed with a spiral gear 51 that is mounted upon a shaft 52, the latter being journaled in the housing and disposed transversely of shaft 45. The shaft 52 projects from opposite sides of the housing 48 and at one end is operatively associated with a magnetic revolution counter 53, Fig. 2. The opposite end of the shaft 52 is exposed so that a tachometer may be manually applied thereto, upon occasion, for mechanically indicating the speed of rotation of the shaft 52 and thus to indicate the speed of rotation of the tire 17.

As previously stated, the tire 17 is peripherally driven by the drum 14, and is urged against the latter by determinate force to simulate the load usually carried by a tire in normal use. To this end a fluid-expansible element is interposed between the frame-plate 40 and the slide 33. Said fluid-expansible element is a bellows 55 that is substantially identical with the air-spring bellows shown in U. S. Patent No. 2,208,537, issued July 16, 1940, to Roy W. Brown, so that an extensive description thereof need not be given herein. The bellows 55 comprises a tubular wall of rubber and fabric construction, and intermediate its ends is constricted by an externally applied girdle ring 56, the arrangement being such that the interior of the bellows consists of two air-connected chambers. The upper end of the bellows is closed by a top-closure plate 57 to which it is secured by a clamping ring 58. In like manner the lower end of the bellows is closed by a bottom-closure plate 59 to which it is secured by a clamping ring 60.

Figure 5:
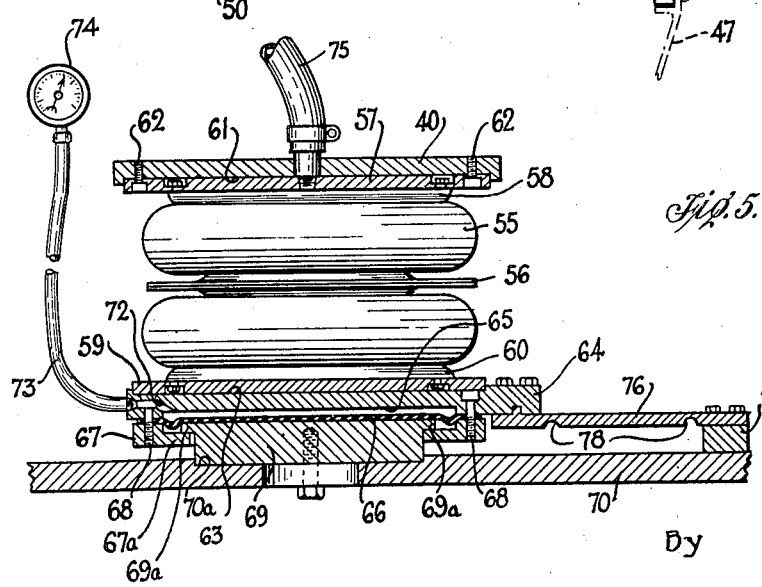
Fig. 5 is a section on the line 5—5 of Fig. 1, a part thereof being shown in elevation.

The top-closure plate 57 is received in a shallow recess 61 of complemental shape formed in the bottom face of frame-plate 40, the plate 57 being secured to the latter by screws 62, as is clearly shown in Fig. 5. The bottom-closure plate 59 seats in a shallow, complementally shaped recess 63 formed in the upwardly presented face of a base plate 64. The latter has a circular recess 65 formed in its bottom face, which recess is covered by a flexible diaphragm 66 of rubber or rubber-like composition, said diaphragm being marginally secured to the base plate 64 by a retaining ring 67 that is secured to the base plate by screws 68. The retaining ring 67 is formed with an inwardly extending circumferential flange 67a that underlies an outwardly extending circumferential flange 69a formed at the top of a circular member 69, the diaphragm 66 bearing against the top of the latter. The member 69 is mounted in a shallow recess 70a formed in the top face of a shelf or bracket 70 that is carried by the slide 33 and which is disposed transversely of the slide and transversely of the central plane of the apparatus. The shelf 70 has the margin thereof that is nearest the drum 15 tilted somewhat downwardly, and the axis of the airspring device carried thereby is perpendicular to said shelf, and also perpendicularly to the frameplate 40 during the normal operation of testing a tire 17.

As is most clearly shown in Fig. 5, the base plate 64 of the bellows is capable of limited axial movement from and toward the member 69, and for opposing such movement, the chamber which comprises the recess 65 and diaphragm 66 thereover is filled with a liquid such as oil. For registering the pressure applied to said oil, the said chamber is provided with a port 72 from which extends a conduit 73 that connects at a relatively remote point with a suitable pressure gauge 74. The bellows 55 is arranged to be inflated with air, and to this end a conduit 75 communicates with the interior of the bellows through suitable connections that extend through the plates 40 and 57, axially thereof. The conduit 75 connects with a suitable source of air under pressure (not shown), and suitable electrically operated valve means (not shown) are provided whereby air in the bellows quickly may be evacuated therefrom through said conduit. For stabilizing the movement of the base plate 64 with relation to the member 69, a portion of said plate 64 extends laterally beyond the retaining ring 67 and is secured to one marginal portion of a stabilizer plate 76, the opposite marginal portion of the stabilizer plate being secured to a mounting block 77 that is attached to the upwardly presented face of the shelf 70. The under side of the stabilizer plate 76 is deeply scored or grooved at 78, 78, transversely of the plate to render it more flexible.

When the bellows 55 is inflated, it swings the frame 37 about its pivot on the shaft 36 and thereby urges the tire 17 against the peripheral face of the rotating drum. With the tire inflated to the proper pressure, the arrangement of the various elements of the apparatus during the testing of a tire is such as is shown in Fig. 1. Thus upon failure of the tire being tested, due to blowout or to excessive growth resulting in decrease of pressure therein, the expansive force of the air in the bellows 55 will swing the frame 37 in the direction that moves the spindle 45 farther toward the drum 14, and this movement of the frame 37 is utilized to effect evacuation of the bellows 55. To this end an electrical switch 80 is mounted upon an arm 81 that is secured to the base plate 64, the said switch being provided with an operating lever that projects over the edge of the frame-plate 40. The switch 80 is arranged to operate electrical apparatus (not shown) that opens the valve (not shown) that is operatively connected to the conduit 75, whereby evacuation of the bellows 55 is effected. When the bellows is evacuated, the frame 37 tilts by gravity to move the tire 17 away from the drum 14. As a safety feature, means is provided for limiting the angular movement of the tiltable frame 37 under the impetus of the inflated bellows 55. To this end the frame-plate 40 is formed on its top side with an integral arm 84 extending radially therefrom in the direction of the drum 14, and pivotally connected to the free end of said arm 84 is a downwardly extending link 85, the lower end portion of said link being formed with a slot 86. Received in said slot is a pin 87 that is carried by a bracket arm 88 that projects downwardly from the slide 33 beneath the shelf 70 thereof. The length of the slot 86 defines the limits of angular movement of the frame 37.

Pressure of the tire 17 against the drum 14, during the testing of a tire, will produce reaction against the frame structure of unit B. To oppose said reaction, tie rods 90, 90 are provided and connect the top frame member 25 of unit B to the respective standards 11 of unit A. The tie rods 90 are parallel to each other and located at opposite sides of the center plane of the apparatus, and are pivotally connected at their opposite ends to said frame members, the arrangement being such as to enable the frame structure of unit B to be oscillated when the tire test includes the application of side thrust to the tire.

In the operation of the apparatus, a tire 17 to be tested is mounted upon a wheel and rim structure 47 and inflated to the desired or preferred pressure, after which the wheel is mounted upon the flange 46 of rotatable spindle 45. The screw 34 may then be rotated to move the slide 33 and thereby to move the tire into proximity to the drum 14, or into peripheral contact therewith. The drum 14 is constantly driven during a test, preferably at a determinate speed, to impart the desired rotary speed to the tire. Such speed may be indicated by the magnetic revolution counter 53, or may be determined by applying a tachometer to the projecting end of shaft 52, as the tire is driven. Next the bellows 55 is inflated, thus causing axial elongation thereof and tilting the triangular frame 37 about its pivot at 36 to force the tire 17 against the drum 14 with determinate pressure, thereby applying a load to the tire in simulation of the load normally present on a tire in service. It will be noted that the force of the bellows 55 is transmitted by the arms 41 of the frame 37 longitudinally of the latter, directly to the spindle 45 that mounts the tire 17, there being no levers employed in the tire-loading mechanism. If the tire is to be subjected to sidethrust strains, the motor 27 is driven; otherwise the frame members of unit B are retained against oscillating movement by use of the cross-braces 30. The load upon the tire is indicated upon the gauge 74.

The test continues until the tire fails, either by blow-out or by excessive growth, whereupon the pressure in the bellows 55 is enabled to lift the frame plate 40 sufficiently to operate the electrical switch 80, thereby effecting operation of the valve (not shown) that evacuates the pressure fluid from the bellows 55. Since the mass of the frame 37 is eccentrically disposed with relation to its pivot 36, evacuation of the bellows 55 will enable the said frame to tilt, by gravity, in the direction that effects retraction of the tire 17 from the drum 14. This completes a cycle of operation.

The apparatus of the invention is relatively small and compact as compared to prior machines for testing tires. The use of the bellows or "airspring" as a means for yieldingly urging the tire against a drum avoids fluid leakage and other objectionable features found in piston type fluid pressure devices. The invention is free of objectionable features inherent in tire testing machines employing static weights and/or levers, and achieves the other advantages set out in the foregoing statement of objects.

Modification may be resorted to without departing from the spirit of the invention, or the scope thereof as defined by the appended claims.

I claim:

1. In tire testing apparatus, the combination of a rotatable drum adapted for peripheral engagement with a tire to rotate the latter, and means for urging the tire yieldingly against the drum, said means comprising a tiltable support upon which the tire is journaled, a fluid-expansible element operatively engaging said tiltable support to tilt the same and thereby to urge the tire against said drum, a yielding seat for said fluid-expensible element, and means controlled by the yielding of said seat for gauging the force exerted by the fluid-expansible element.

2. A combination as defined in claim 1 wherein the seat for the fluid-expansible member comprises a deformable reservoir for liquid, and the gauging means is operated by liquid displaced from the reservoir by deformation thereof.

3. In tire testing apparatus, the combination of a rotatable drum adapted for peripheral engagement with a tire to rotate the latter, a triangular frame, means pivotally supporting said frame at one corner thereof for swinging movement parallel to the plane of the drum, means at another corner of the frame adapted rotatably to support a tire, and force-applying means engaging the frame at the third corner thereof for swinging the frame on its pivot to urge the tire against the drum.

4. A combination as defined in claim 3 including a slide that carries the frame and the force-applying means, and means for adjusting the slide relatively of the drum preparatory to the testing of a tire.

5. In tire testing apparatus, the combination of a rotatable drum adapted peripherally to drive a tire bearing thereagainst, a frame structure adjacent said drum comprising pivotally mounted side frame members disposed on opposite sides of the plane of the drum, and a horizontally arranged top frame member pivotally connected to the side frame members at the top thereof, means for oscillating the side frame members to impart parallel reciprocatory movement to the top frame member transversely of the plane of the drum, and means carried by the top frame member for supporting the tire in the plane of the drum and yieldingly urging it thereagainst.

6. A combination as defined in claim 5 including means for rigidly securing the top frame member and side frame members against pivotal movement relatively of each other when axial reciprocation of the tire is not desired.

7. A combination as defined in claim 5 including a slide mounted on the top frame member for adjustment from and toward the drum, and means for adjusting the position of the slide relatively of the top frame member preparatory to the testing of a tire, the tire supporting means and the means yieldingly urging the tire toward the drum being mounted on said slide.

8. In tire testing apparatus, the combination of a rotatable drum adapted peripherally to drive a tire bearing thereagainst, supporting means for said drum comprising standards at opposite sides thereof, a frame structure adjacent the drum comprising a top frame member reciprocable transversely of the plane of the drum, means carried by the top frame member for supporting a tire and yieldingly urging it against the drum, and parallel tie rods connecting the said top frame member to the respective drum-supporting standards.

9. A combination as defined in claim 8 wherein the tie rods are pivotally connected to the top frame member and to the standards.

10. In tire testing apparatus, the combination of a rotatable drum adapted for peripheral engagement with a tire to rotate the latter, a triangular frame, means pivotally supporting said frame at its apex, means supporting the tire in contact with the drum at one base angle of the frame, and an axially expansible bellows acting upon the frame at the other base angle thereof to urge the tire against the rotatable drum.

RAYMOND W. ALLEN.